Figure 1:
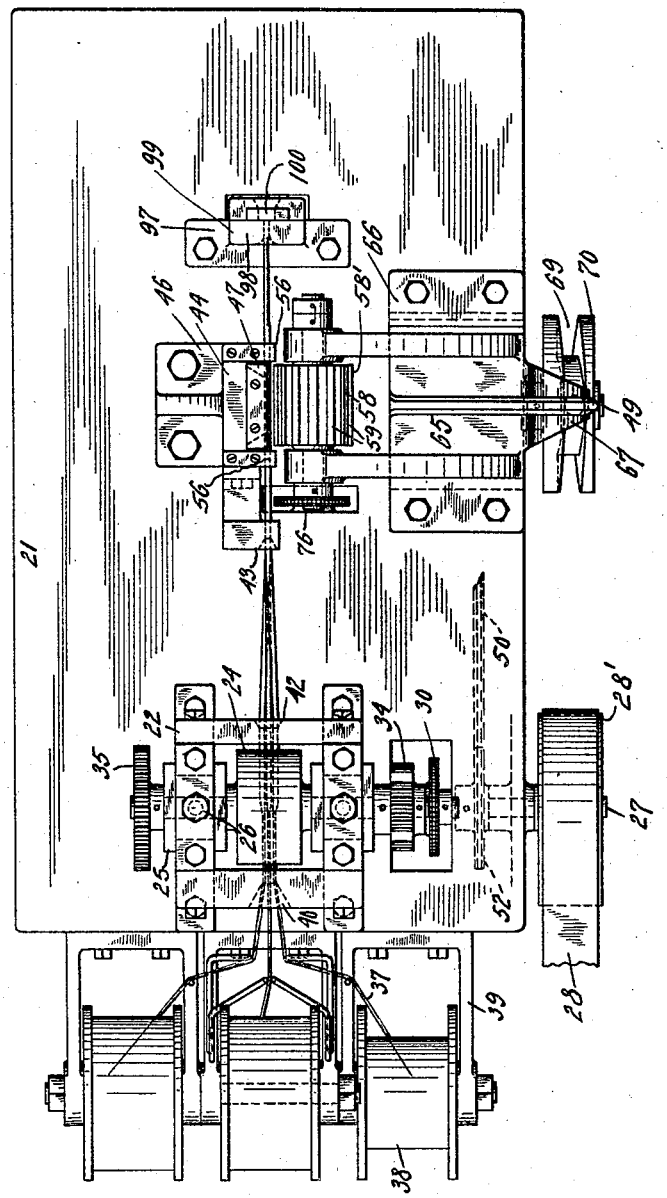

A. KÖNIG.
MACHINE FOR FORMING SAW BLADES.
APPLICATION FILED MAR. 15, 1919.

1,341,806.

Patented June 1, 1920.
5 SHEETS—SHEET 1.

INVENTOR
A. König
BY
Sigmund Herzog
ATTORNEY

A. KÖNIG.
MACHINE FOR FORMING SAW BLADES.
APPLICATION FILED MAR. 15, 1919.

1,341,806.

Patented June 1, 1920.
5 SHEETS—SHEET 3.

INVENTOR
A. König
BY
[signature]
ATTORNEY

A. KÖNIG.
MACHINE FOR FORMING SAW BLADES.
APPLICATION FILED MAR. 15, 1919.

1,341,806.

Patented June 1, 1920.
5 SHEETS—SHEET 4.

INVENTOR
A. König
BY
ATTORNEY

A. KÖNIG.
MACHINE FOR FORMING SAW BLADES.
APPLICATION FILED MAR. 15, 1919.

1,341,806.  Patented June 1, 1920.
5 SHEETS—SHEET 5.

INVENTOR
A. König
BY Sigmund Herzog
ATTORNEY

UNITED STATES PATENT OFFICE.

ADOLF KÖNIG, OF HOBOKEN, NEW JERSEY.

MACHINE FOR FORMING SAW-BLADES.

1,341,806.  Specification of Letters Patent.  Patented June 1, 1920.

Application filed March 15, 1919. Serial No. 282,782.

*To all whom it may concern:*

Be it known that I, ADOLF KÖNIG, a citizen of the United States, and a resident of Hoboken, in the county of Hudson and State of New Jersey, have invented certain new and useful Improvements in Machines for Forming Saw-Blades, of which the following is a specification.

The present invention relates to improvements in machines for forming saw-blades, and more particularly saw-blades of small dimensions, such as for instance jig-saws, jewelers' saws and the like.

The main object of the invention is to provide a machine that is simple in construction, efficient in operation and which performs the work entirely automatically.

Another object of the invention is to produce a machine of the character mentioned which, besides performing the teeth-cutting operation, forms the saw-blanks from wire of circular cross-section.

A further object of the invention is to construct a machine of the type mentioned, which is continuous in operation in that its elements are disposed in such a manner that, first, the blade-blank is formed, second, the teeth cut, and, finally, the finished product severed from the strip of which the blanks are formed.

A still further object of the invention is to provide a cutting tool, whereby the entire row of teeth of a saw-blade may be cut simultaneously, that is to say by a single operation, without necessitating a shifting of the blank or a resetting of the cutting tool.

Another object of the invention is to provide a method of forming a saw-blade cutting tool for performing the cutting operation in the manner specified.

A further object of the invention is to construct a machine of the type specified, whereby a plurality of saw-blades are formed simultaneously.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 2:
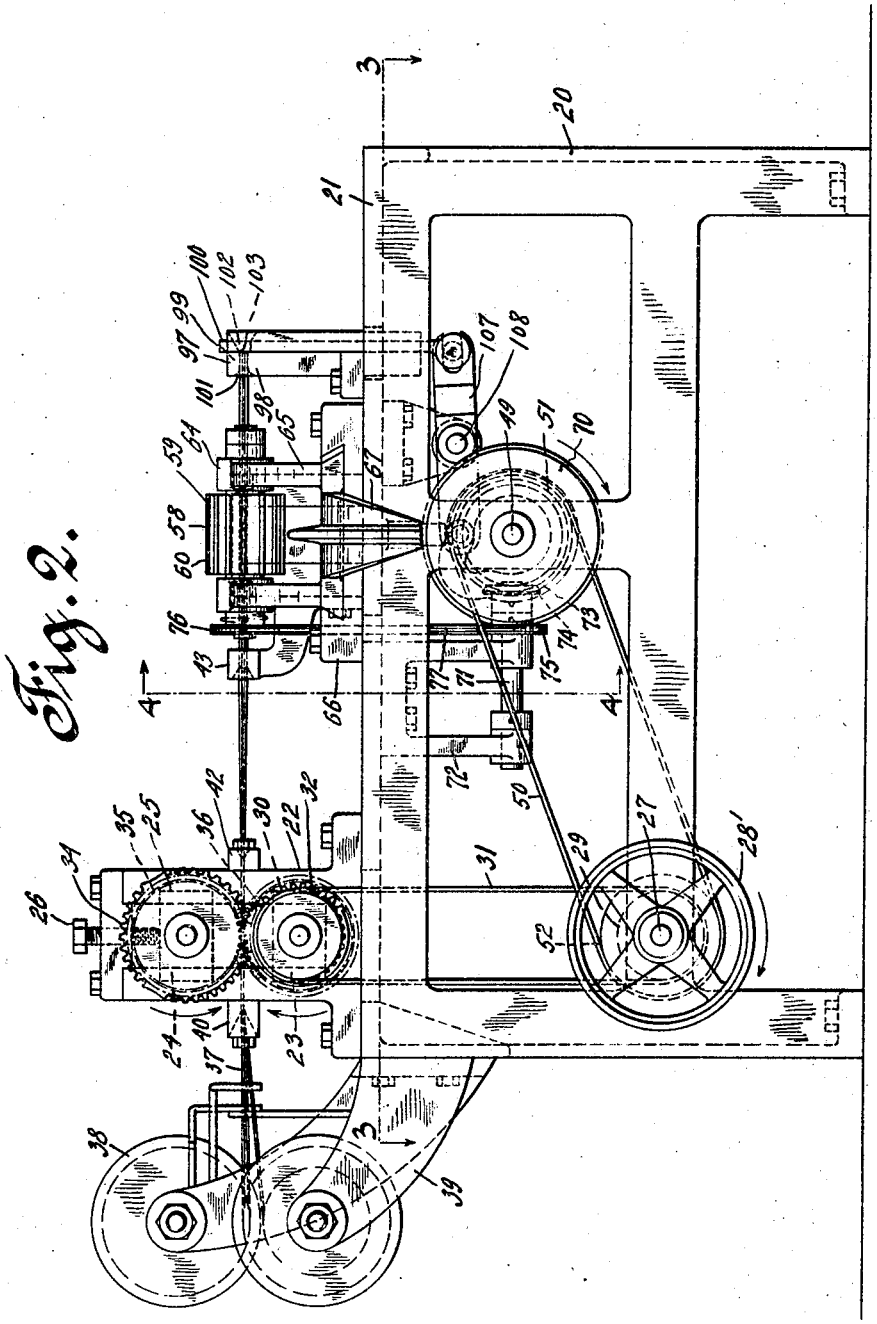
Figure 3:
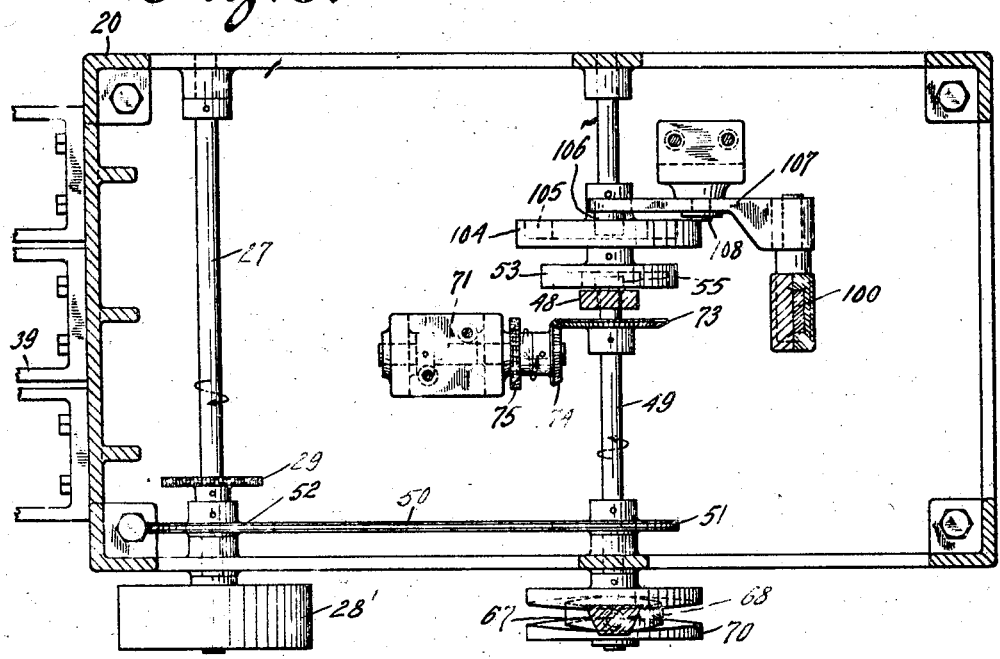
Figure 6:
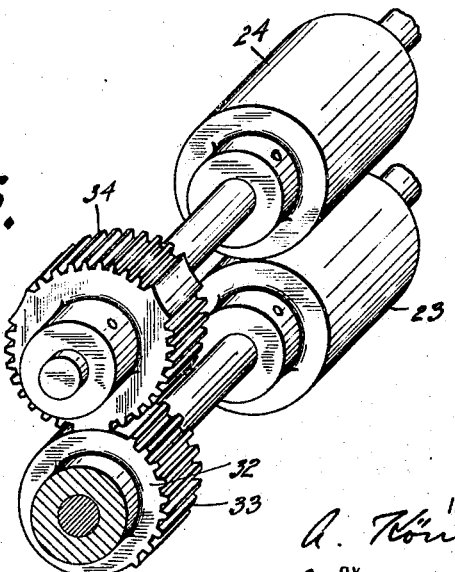
Figure 4:
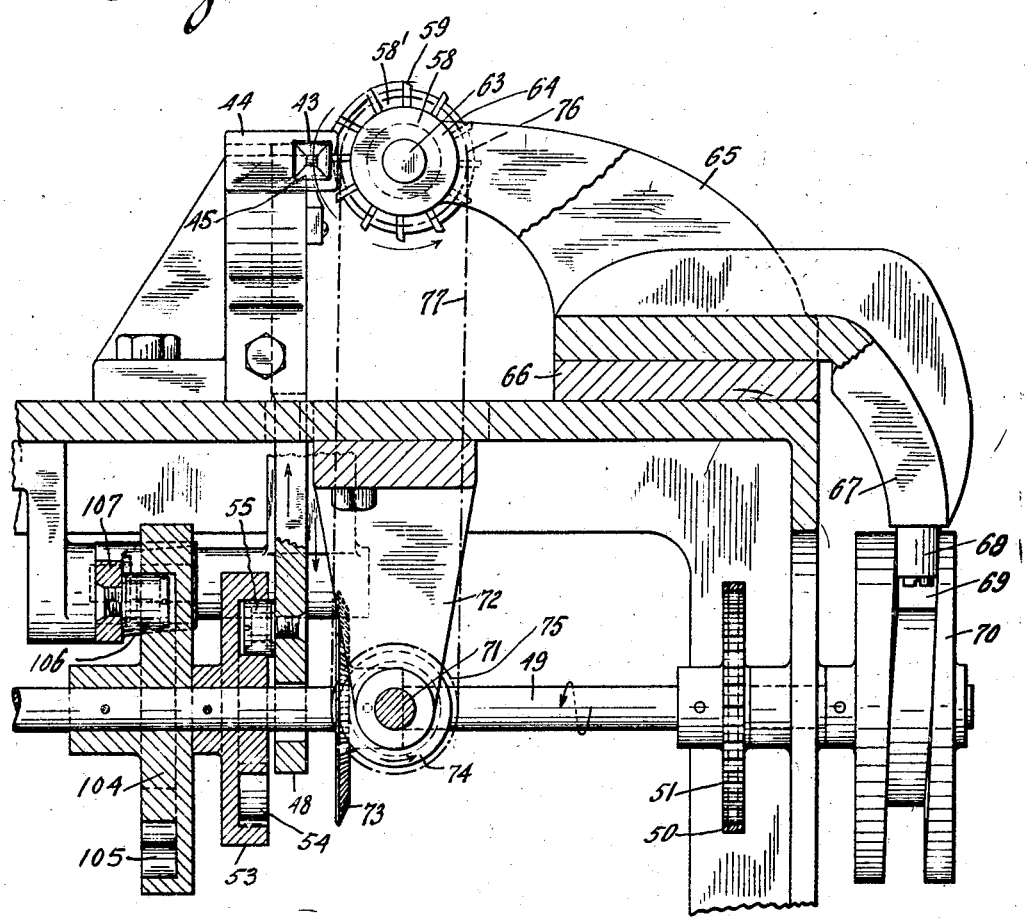
Figure 5:
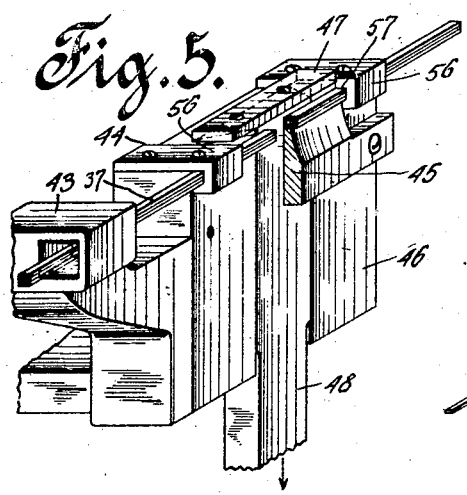
Figure 11:
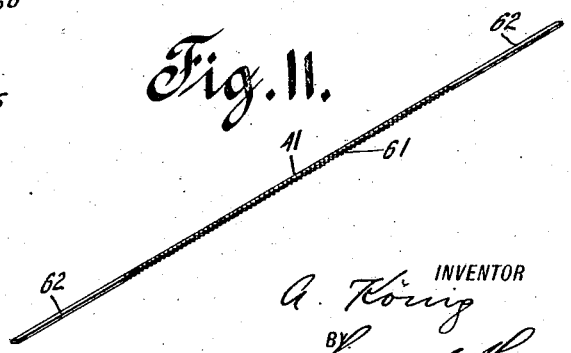
Figure 7:
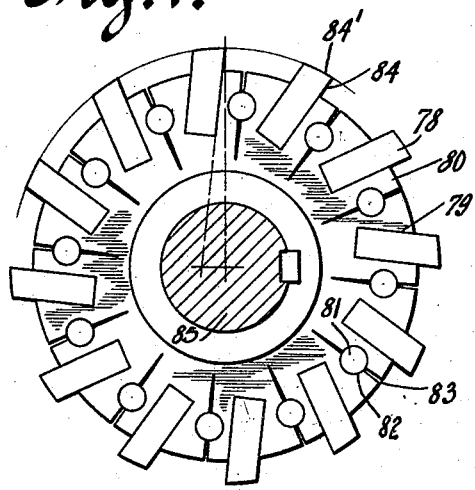
Figure 8:
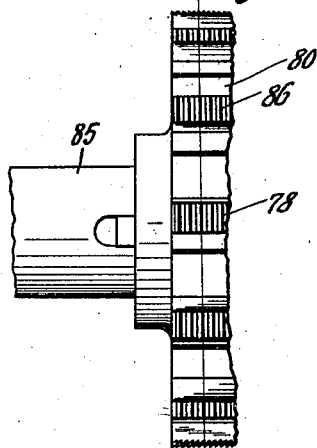
Figure 9:
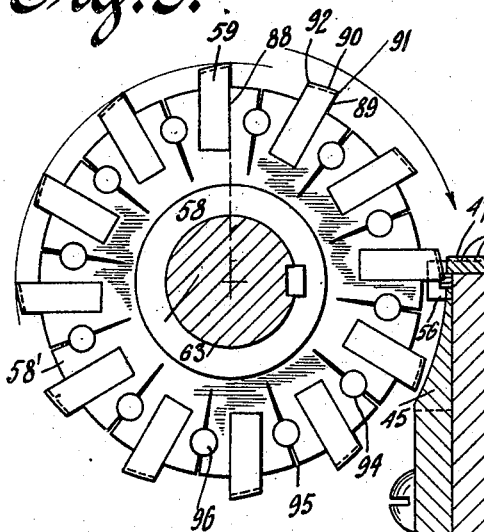
Figure 10:
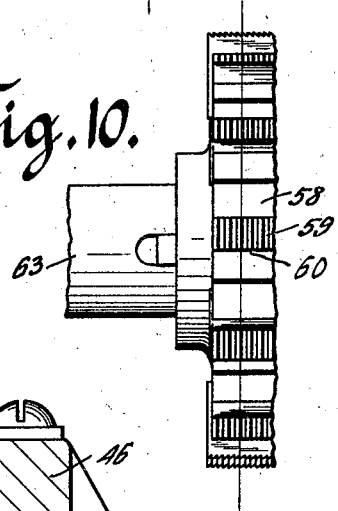

Figure 1 is a top plan view of a saw-forming machine, constructed in accordance with the present invention; Fig. 2 is a side elevation thereof; Fig. 3 is a section taken on line 3—3 of Fig. 2; Fig. 4 is a section taken on line 4—4 of Fig. 2, on a larger scale; Fig. 5 is a perspective view, partly in section, of the work holding means of the machine; Fig. 6 is a perspective view of a detail of construction, showing a mechanism for intermittently moving the feeding rollers of the machine; Fig. 7 is a side elevation of a drum and the cutting tools thereon in the process of making the same; Fig. 8 is a plan view of a portion of the mechanism, shown in Fig. 7; Fig. 9 is a side elevation of the finished cutting tool; Fig. 10 is a plan view of a portion thereof; and Fig. 11 is a perspective view of the finished product made on the improved machine.

In the drawings, the numeral 20 indicates the machine frame, including a table portion 21. From this table rise bearing-blocks 22, in which are rotatably mounted shaping rollers 23 and 24, which constitute at the same time the feeding means of the apparatus. The lower roller 23 may be mounted in the bearing-blocks themselves, while the upper roller 24 is journaled in boxes 25, which are shiftable upon the bearing-blocks 22, set screws 26, abutting against the boxes, serving to adjust the distance between the shaping rollers. One of these rollers is rotated from a driving shaft 27, that is journaled in the machine frame and receives motion from any suitable source of power by the intermediary of a belt 28, running over a pulley 28' upon the driving shaft. This shaft is geared to the upper roller 24, to impart intermittent rotation to the latter. For this purpose there is fixed to the driving shaft, for instance, a sprocket wheel 29, in alinement with a sprocket wheel 30, that is loosely mounted upon one of the journals of the lower shaping roller 23. Over these sprocket wheels runs a chain 31. To the sprocket wheel 30 is fixed a mutilated gear 32, having teeth 33 extending only over one-third of its periphery, said teeth being adapted to mesh with those of a mutilated gear 34, that is keyed or otherwise attached to one of the journals of the upper shaping roller 24. The teeth of the gear 34 are divided into three equal portions, so that one complete revolution of the mutilated gear 32 results in one-third turn of the upper shaping roller 24. To the other journal of this last-mentioned shaping roller is fixedly attached a gear 35, in mesh with a gear 36, that is in a similar manner attached to the lower shaping roller 23. The ratio of the gears 35 and 36 is 1:1.

The shaping rollers are of equal diameter, and the perimeter of each of the same is of a length that corresponds to the combined lengths of three saw-blades, so that during each revolution of the driving shaft 27 the shaping rollers feed toward the cutting mechanism material of the length of a saw-blade.

The material, of which the saw-blades are formed, is in the form of wire, denoted by the numeral 37, of circular cross-section, said wire being wound upon a reel. In the case illustrated in the drawings, there are three reels 38 provided, the same being rotatably journaled in brackets 39, which are fixed to the frame 20. The three wires, issuing from the reels, are led through a guide 40, in front of the bearing-blocks 22, said guide being so shaped that the three wires run side by side in a horizontal plane as they reach the shaping rollers. These rollers form saw-blanks by shaping the wires so that they become substantially quadrangular in cross-section, as appears from the finished saw 41, shown in Fig. 11 of the drawings. After the shaping operation, the wire strips run through a guide 42, in rear of the shaping rollers, and are then led through a guide 43, which is formed in such a manner that three strips become disposed one on top of another. The guide 43 is fixedly attached to a work holder 44.

The work holder comprises a stationary jaw 45, which is fixed to a standard 46, that rises from the table portion 21 of the machine frame, and a movable jaw 47, carried by a vertically extending slide 48, the latter being actuated in unison with the shaping and feeding rollers from a counter shaft 49. The counter shaft is rotatably journaled in the machine frame and receives motion from the main driving shaft, for instance, by a chain 50, running over sprocket wheels 51 and 52 on the said counter shaft and main shaft, respectively. The counter shaft revolves at the speed of the main shaft and has fixed to it a disk 53, having a cam groove 54, in which is seated a roller 55, that is carried by the slide 48. The relation between the cam groove 54 and the mutilated gears above referred to is such that, during the feeding operation of the rollers 23 and 24, the movable jaw 47 is in its upper position, but is brought to clamping position and held therein while the feeding rollers remain stationary. To prevent a sideward shifting of the wire strips while the movable jaw 47 of the work holder is disengaged therefrom, there are attached to the standard 46, both in front and in rear of the movable jaw 47, stationary keepers 56, said keepers being each provided with a quadrangular bore 57, into which the three wire strips fit one on top of another.

With the work holder coöperates a cutter 58, including a cylindrical body 58′, upon which is mounted, in a manner hereinafter to be described, a plurality of radially extending cutting tools 59, each of the latter being in the form of a bar, provided throughout its length with a series of equidistantly spaced cutting faces or cutting teeth 60, that form the serrations in the saw-blanks. The lengths of these bars correspond to the toothed or serrated area 61 of the saw-blade (Fig. 11), there being on the blade on both sides of the toothed or serrated area left a blank space 62, that is to be engaged with the saw-frame. The cylindrical body 58′ is provided with journals 63, which are rotatably mounted in bearings 64 of a carriage 65, that is made to slide on a bed 66, the latter being fixed to the table portion of the machine frame. The carriage 65 moves in a direction at right angles to the direction of travel of the strips, of which the saw-blades are formed, and is provided for this purpose with a downwardly extending projection 67, carrying an anti-friction roller 68, that is seated in a cam groove 69 in a disk 70. This disk is attached to the counter shaft 49, and the relation between the cam grooves 54 and 69 is such that the cutter is caused to move toward the work holder when the jaws of the latter are in clamping position, and to recede from the said work holder when the movable jaw of the latter is being raised.

The cutter is rotated from a shaft 71, which extends at right angles to the longitudinal axis of the counter shaft 49, and is journaled in hanger bearings 72, depending from the table 21. The shaft 71 is geared to the counter shaft, for instance, by keying to the latter a bevel gear 73, in mesh with a bevel gear 74 on the shaft 71. The rotation of the shaft 71 is transmitted to the cutter by a suitable gearing, for instance a sprocket wheel 75 on the shaft 71, in alinement with a sprocket wheel 76 on one of the journals of the cutter. Over these two sprocket wheels runs a chain 77. The stroke of the carriage 65 is comparatively small, so that the reciprocating cutter is adapted to be rotated by the mechanism mentioned from the bodily stationary shaft 71.

In order to properly understand the operation of the cutter, the method of producing the same will first be described, reference being had to Figs. 7 to 10, inclusive, of the drawings. The blanks of which the cutting tools 59 are made are each in the form of a bar 78 (Figs. 7 and 8), that is of oblong cross-section. These bars are placed each into a peripheral recess 79 in a drum 80 and clamped thereto in any suitable manner, for instance by pins 81, that are driven into bores 82 in the said drum, said bores being formed adjacent to radial slots 83 in the drum. The recesses 79 are formed in such a manner that the faces 84 of the bars 78 extend at acute angles to radial lines on the drum. This drum is keyed to a shaft 85. In forming the tool, the drum is rotatably mounted in any preferred manner upon a lathe, on which the bars are shaped so that their faces 84' are disposed on a cylindrical surface. A screw thread 86 is then cut into the faces 84' of the bars 78, said thread being of a pitch according to the size of the teeth to be cut into the saw-blanks and of a cross-section corresponding to the shape of the teeth to be formed. The finished bars or cutting tools, denoted in Figs. 9 and 10 of the drawings by the numeral 59, are then mounted upon the cylindrical body 58', the latter being provided with recesses 88, into which the said bars fit, the said recesses being so shaped that their faces 89 extend in radial lines on the cylindrical body. When, therefore, the cutting tools 59 are placed into these recesses, their faces 84 extend in radial lines, thus giving the cutting edges 90 of the tools a clearance, as their leading edges 91 are disposed at a greater distance from the longitudinal axis of the cylindrical body 58' than their back edges 92. In assembling the cutter, the tools 59 are placed in such relation upon the cylindrical body 58' that the leading edge of each cutting tooth on a bar registers with the leading edges of cutting teeth on the remaining bars on the cylindrical body. The cutting tools are held upon the cylindrical body, for instance, by forming longitudinal bores 94 in the said cylindrical body, between the recesses 88, and a radial slit 95 adjacent each bore. Into these bores are then forced pins 96, holding the cutting tools in position.

When the carriage 65, carrying the cutter now described, moves toward the work holder, teeth are cut into the three saw-blanks throughout the area 61, the cutting operation proceeding simultaneously throughout the length of the said area, inasmuch as the longitudinal axis of the cutter is disposed parallel to the saw-blanks. After having finished the cutting operation, the cutter recedes from the blanks in the manner above described.

From the work holder the finished blades are led to a severing mechanism 97, which separates the finished product from the strips. This severing mechanism comprises a cutting tool, including a stationary blade 98, mounted upon a standard 99, and coöperating with a movable blade 100, that is slidably arranged in the said standard. On the standard 99 is provided a guide 101, through which the three finished saw-blades are led above the stationary blade 98. The movable blade 100 is provided with an aperture 102, through which the finished product passes, the cutting edge 103 of the movable blade being disposed above the finished product before the cutting operation. The movable blade is actuated from the shaft 49, to which is fixedly attached for this purpose a disk 104, having a cam groove 105. Into this groove reaches an anti-friction roller 106 upon a lever 107, the latter being fulcrumed at 108 to a bracket 109, that depends from the table portion of the machine frame. This lever engages the movable blade 100. The relation of the cam groove 105 and the mutilated gears above referred to is such that, while the movable blade 100 of the severing tool is caused to move downward, the shaping rollers are at rest, said blade being held in its upper position while the shaping rollers perform the feeding operation.

Briefly stated, the operation of the machine is as follows:—The shaping rollers 23 and 24 move in the direction of the arrows shown in Fig. 2 of the drawings, advancing the three wires 37 toward the work holder and shaping the same. During each revolution of the driving shaft 27 each wire is fed forward a distance that corresponds exactly to the length of a saw-blade to be formed. The clamps of the work holder keep the three wire strips one on top of another in proper relation to the cutter, the latter being advanced toward the work holder after the movable jaw 47 of the latter has been moved to clamping position. The cutting operation having been performed, the cutter recedes and the shaping rollers become operative, thereby advancing the finished saw blades to the severing tool. Obviously, the distance between the work holder and the severing tool must correspond to the length of a saw-blade to be formed, or to a multiple thereof.

The saw-blades are finally hardened and tempered by means not shown herein, as they do not form part of the present invention.

What I claim is:—

1. A machine for forming saw-blades from wire of circular cross-section, comprising two rollers for shaping the wire to form a strip having a substantially oblong cross-section, a work holder to which said shaping rollers feed the shaped strip, and a rotary cutter coöperating with said work holder, said cutter including a plurality of cutting tools having each a length corresponding to the toothed area of the saw-blade to be formed, said cutting tools being adapted to engage the shaped strips throughout their lengths, thereby cutting the entire row of teeth simultaneously.

2. In a machine according to claim 1, said rollers operating intermittently and their shaping and feeding operation being simultaneous.

3. A machine for forming saw-blades from wire of circular cross-section, comprising two rollers for shaping the wire to form a strip having a substantially oblong cross-section, a work holder to which said shaping rollers feed the shaped strip, and a cutter coöperating with said work holder.

4. In a machine according to claim 3, said rollers operating intermittently and their shaping and feeding operation being simultaneous.

5. A machine for forming saw blades, including a work holder, and a rotary cutter coöperating therewith, said cutter comprising a plurality of cutting tools having each a length corresponding to the toothed area of the saw-blade to be formed, said cutting tools adapted to engage the work throughout their lengths, thereby cutting the entire row of teeth simultaneously.

6. A machine according to claim 1, comprising a severing mechanism for cutting off the finished product from the shaped strip.

Signed at New York, in the county of New York, and State of New York, this 3rd day of March, A. D. 1919.

ADOLF KÖNIG.